…

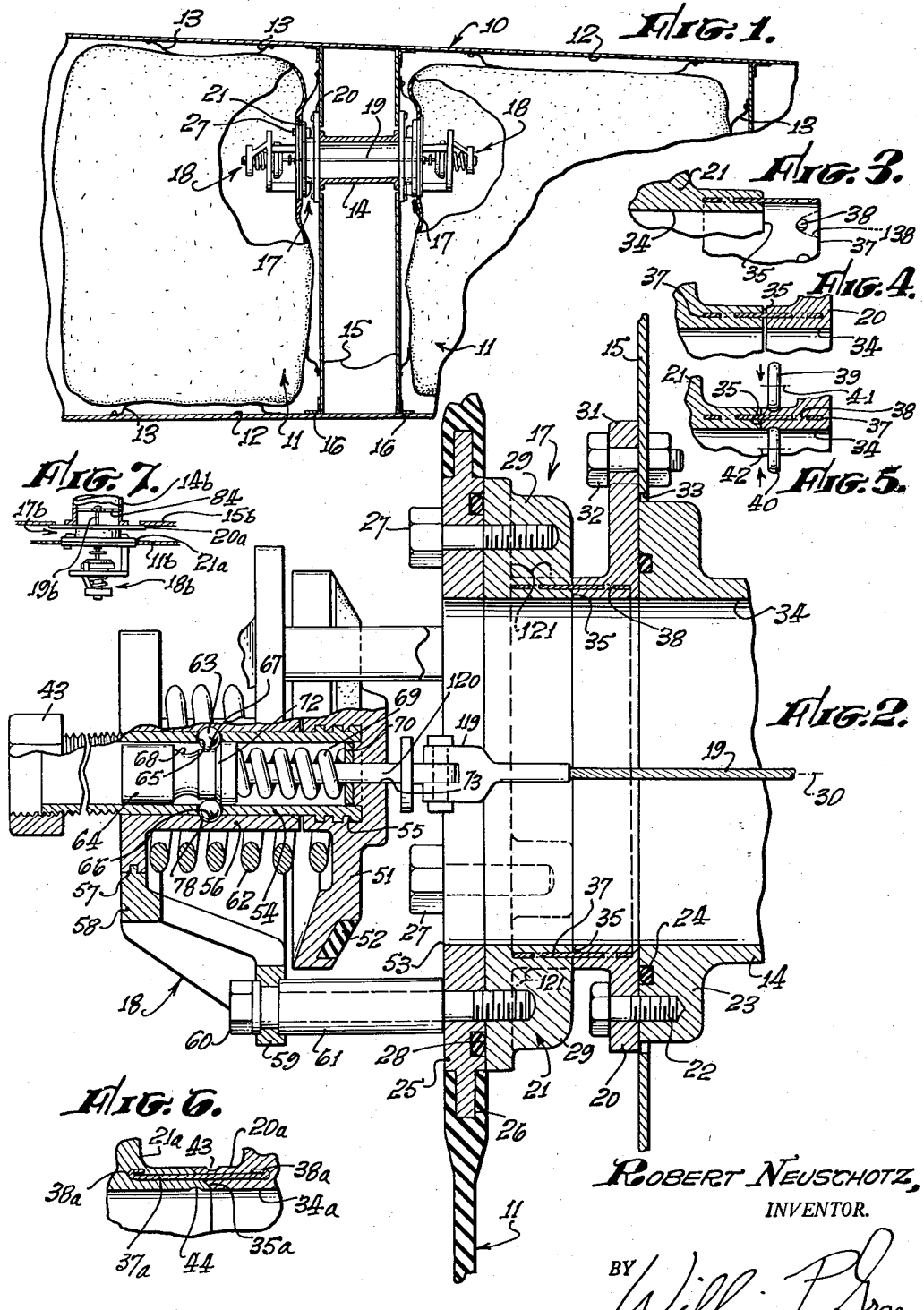

United States Patent Office 3,043,542
Patented July 10, 1962

3,043,542
FRANGIBLE CONNECTOR ASSEMBLY FOR FUEL CELLS
Robert Neuschotz, 1162 Angelo Drive,
Beverly Hills, Calif.
Filed Mar. 10, 1959, Ser. No. 798,473
18 Claims. (Cl. 244—135)

This invention relates to improved fluid conducting fittings especially designed for use in conjunction with crash resistant fuel cells, or other fluid containing cells, of an aircraft.

In order to minimize the danger of fire at the scene of an aircraft crash, there has recently been developed a unique type of crash resistant fuel cell, which is sufficiently strong to resist tearing or rupture under the impact of crash forces of relatively great magnitude. Such a cell can actually be torn from its normal position within the body or wing of an aircraft, and be displaced bodily relative to the rest of the craft, without destroying the integrity of the cell. The purpose of this crash resistant structure is of course to assure effective confinement of the fuel within the cell in spite of the damage caused by a crash, so that the fuel will not spill out at the crash scene and cause a fire.

The general object of the present invention is to provide an improved type of fluid conduit assembly which is adapted to normally place the interior of such a crash resistant cell in communication with an adjacent portion of the aircraft, but which is especially designed to break in response to crash forces of a predetermined relatively low magnitude, to thus allow for complete detachment of the cell from the rest of the aircraft without danger of damaging the cell fittings at an undesired point. This detachable connection may be employed to connect the cell to any of various other parts of the aircraft, such as another fuel cell, an engine, a vent opening, or the like. Together with the conduit assembly, I preferably also employ an automatic shut-off valve, such for example as the valve claimed in my copending application Serial Number 789,013 filed January 26, 1959, on "Automatic Shut-Off Valve," which valve functions to automatically close off communication between the interior of the cell and its exterior through the mentioned conduit assembly, as soon as the conduit assembly is broken.

Particularly contemplated by the present invention is an assembly of the above discussed type which, though designed to be broken by relatively small forces at the time of a crash, is nevertheless so constructed as to effectively resist breakage under the vibrational and other forces which are encountered in normal operation of the aircraft. A connnection embodying the invention is so designed that the required breaking force can be predetermined very accurately and reliably. Further, the apparatus is so designed as to maintain the fluid tight integrity of the connection, without fail, until the connection is broken.

To attain these results, I utilize a conduit assembly consisting of two axially aligned fittings, one of which is attached to the fuel cell, and the other of which is connected to another portion of the aircraft. These two fittings or parts are both tubular, with one forming a continuation of the other, and these parts are secured together by an intermediate connector ring which has its opposite ends embedded in the two mentioned parts respectively. The intermediate ring is preferably weaker in structure than the other two parts and is designed to be breakable or deformable in response to predetermined crash forces, in a manner freeing the two main parts within which it is embedded for separation from one another. The intermediate ring may be relatively thin as compared with the two parts within which it is embedded, but is normally formed of a material whose frangibility or deformability under small crash forces can be much more accurately predetermined than would be true of a similarly thin section of the material utilized in the two main connector elements. More particularly, it is preferred in same installations that the two main fittings be formed of die cast aluminum, while the frangibile ring embedded within these fittings be formed of stainless steel, bronze, or the like, preferably rolled of otherwise worked in a manner giving it greater uniformity and strength than a casting in parts of small cross section.

The above and other features and objects of the present invention will be better understood from the following detailed description of the typical embodiments illustrated in the accompanying drawing in which:

FIG. 1 is a view representing a pair of fuel cells, typically positioned within an aircraft wing, together with the connector fittings of the present invention, and the associated automatic shut-off valves;

FIG. 2 is an enlarged fragmentary section through one of the connecting assemblies and valves of the FIG. 1 apparatus;

FIGS. 3, 4 and 5 show three successive steps in the formation of the connecting assembly utilized in FIGS. 1 and 2;

FIG. 6 is a view similar to FIG. 5, but showing a variational form of the invention; and FIG. 7 shows another form of the invention.

In FIG. 1, there is shown at 10 a portion of the wing of an aircraft (or the body of an aircraft), containing a number of individual fuel cells 11 located within separate compartments 12. Each of the cells 11 takes the form of a fluid tight bag or bladder, adapted to contain and confine the fuel of the aircraft without leakage. The walls of the cells are normally formed of a flexible woven fabric embedded within and reinforcing flexible rubber or resinous plastic material. Each of the cells is held in position in the wing or fuselage by means of a series of tabs 13 or other holding elements, which may initially be secured to the cell wall and are adapted to be fastened in any suitable manner to the structure of the aircraft. These tabs or connections 13 are of a type adapted to be relatively easily broken in the event of a crash tending to tear the cells 11 from the adjacent wing structure. In the present disclosure, it may be assumed that each of the cells 11 is constructed of sufficiently heavy and strong material that, if a crash tears the cell from its normal position in the aircraft, the cell itself will remain intact, and will not rupture at any point, so that the contained fluid is still confined effectively within the cell and is not allowed to spill over the wreckage in a manner introducing danger of fire at the crash scene.

The two adjacent cells 11 shown in FIG. 1 are placed in intercommunication, for flow of fuel therebetween, by means of a tubular fluid tight interconnector 14, typically extending between a pair of walls or structural elements 15 disposed transversely of the wing length at spaced locations. These walls 15 may be rigidly attached to the rest of the wing structure, as by angle irons represented at 16. The opposite ends of the interconnector 14 are secured to cells 11, and to walls 15 if such walls are present, by means of a pair of connecting assemblies represented generally at 17, which assemblies are constructed to break in response to crash forces of predetermined magnitude exerted thereagainst. In conjunction with the two connecting assemblies 17, there may be provided at the opposite ends of interconnector 14 two automatic shut-off valve assemblies 18, which may be interconnected by an actuating cable 19, and are adapted to close off all communication between the interior of each of the cells and its exterior at the location of interconnector 14 when either of the connecting assemblies 17 is broken. These automatic shut-off valve assemblies 18 are typically of the type shown and claimed in my copending application Serial Number 789,013 filed January 26, 1959, on "Automatic Shut-Off Valve."

With particular reference now to FIG. 2 of the drawing, it is noted that each of the connecting assemblies 17 includes two axially abutting tubular rings or fittings 20 and 21, the first of which is rigidly attached by bolts 22 to a flange 23 formed at one end of interconnector 14. An elastomeric O-ring 24 may be provided between parts 20 and 23, to form a fluid tight seal therebetween. The second fitting 21 of assembly 17 is rigidly attached to an annular element 25, which is externally vulcanized or otherwise fastened in fluid tight sealing relation, at 26, into an opening in the wall of cell 11.

Ring 25 is rigidly secured to ring 21 at a series of circularly spaced locations by a number of bolts 27, with a seal being formed between these parts by elastomeric O-ring 28. Part 21 may be considered as being completely annular and of the L shaped cross-section indicated by broken lines 121 in FIG. 2, except at the location of a series of circularly spaced enlargements or bosses 29, into which the bolts 27 and a number of additional latter-to-be-described valve mounting bolts 60 are connected. (See also FIGS. 3 to 5 for L-shaped configuration.) Ring 20 may also be considered to be completely annular and of the L shaped cross-section shown in the lower portion of FIG. 2, except at the location of a series of evenly circularly spaced radially projecting lugs 31 (see upper portion of FIG. 2), which may be rigidly secured by bolts 32 to one of the structural walls 15 of the aircraft wing. Each of the walls 15 contains an opening 33, through which the interconnector 14 and its attached parts extend.

As seen clearly in FIG. 2, it is preferred that the inner cylindrical surfaces 34 of all of the parts 14, 20, 21 and 25 be of a common diameter, and be aligned axially with one another, to form together an essentially continuous cylindrical passage through all of these parts. At the juncture of the two parts 20 and 21, in the form of the invention shown in FIG. 2, these two elements 20 and 21 have annular surfaces 35 which may extend directly radially with respect to the main axis 30 of the apparatus, and which desirably abut against one another along their entire annular extent. The two parts 20 and 21 may be entirely unattached to one another at their surfaces 35 except through the specially designed frangible connector part 37. This part 37 may be essentially a straight cylindrical thin walled tube, half of which is embedded within the material of part 20, while the other half is embedded within the material of part 21. As will be apparent, the radial thickness of part 37 is small as compared with the radial thickness of the portions of rings 20 and 21 within which part 37 is received, and this difference in thickness is desirably such as to render part 37 substantially weaker and more easily torn or deformed than are rings 20 and 21. Part 37 forms an effective fluid tight annular seal between parts 20 and 21, and maintains the assembly 17 in its illustrated fluid conducting unitary condition under all normal operating conditions of the aircraft. However, in the event of a crash of the aircraft, the part 37 breaks or tears in a manner allowing separation of those two parts, so that cell 11 may be displaced freely relative to framework 15 and interconnector 14.

The two parts 20 and 21 may be formed of a material such that, if this material were itself reduced in thickness at a localized area to the thickness of the frangible part 37, then the vibrational forces encountered in normal operation of the aircraft would relatively rapidly cause a break or leak in the assembly at that reduced thickness location. For example, in one preferred embodiment of the invention, parts 20 and 21 are formed of die cast aluminum. The part 37, on the other hand, is of a material which is capable of withstanding the mentioned vibrational forces without any danger of breakage, even though part 37 may be of a very thin walled configuration. As an example, ring 37 may be formed of stainless steel, or of bronze. At the location of the juncture of parts 20 and 21, element 37 is imperforate. However, at locations offset axially from the juncture of parts 20 and 21, and embedded deeply within the material of parts 20 and 21, element 37 may contain circularly spaced apertures 38, through which the aluminum of castings 20 and 21 can extend in a manner tightly interlocking the part 37 to parts 20 and 21.

FIGS. 3 to 5 represent somewhat diagrammatically a preferred method for manufacture of the connecting assembly consisting of parts 20, 21 and 37. In the first step of this method, represented in FIG. 3, a first of the rings 20 or 21 is die cast in a conventional die casting machine, with one end of part 37 embedded therein. In step 2, shown in FIG. 4, the second of the two parts 20 or 21 is die cast in proper position about the second end of part 37. This is an entirely different die casting operation, and the first formed part (21 in FIGS. 3 and 4) does not melt during the second die casting operation, so that there is no bond formed between the abutting surfaces 35 of these two parts. In the FIG. 4 step, the shrinkage of the metal of part 20 after its formation will normally leave a narrow gap between parts 20 and 21, as shown. Therefore, as illustrated in FIG. 5, it is preferred that the material of one of the die cast parts 20 or 21 be annularly rolled in a manner closing this gap, and bringing the surfaces 35 into direct abutting engagement. For this purpose I may utilize two rollers 39 and 40 engaging the radially outer and inner surfaces of part 20, and mounted to turn about individual axes 41 and 42 as part 20 turns about its main axis 30. These rollers 39 and 40 have been shown only diagrammatically in FIG. 5, but their manner of operation will be apparent from that showing.

FIG. 6 shows a variational form of connector assembly 17, which may be considered to be the same as that of FIGS. 1 to 5, except in the following respects. In the first place, the abutting surfaces 35a of parts 20a and 21a in FIG. 6 are of tapering configuration with respect to the axis of the device (axis 30 of FIG. 2), instead of extending directly radially as do the surfaces 35 of FIG. 2. Also, the ends 38a of intermediate ring 37a are interlocked mechanically with rings 20a and 21a by folding of ends 38a as shown, rather than by the provision of apertures as shown at 38 in FIG. 2. As in FIGS. 3 to 5, the material of the die cast parts may be deformed annularly at 43 and 44, by rollers such as those shown at 39 and 40 in FIG. 5, to close the gap which is formed between surfaces 35a by the die casting operation. It is contemplated, however, that this may not be necessary where surfaces 35a are tapered, since the part 20a is cast after the casting of part 21a and tends to shrink radially upon cooling, and to thereby tighten surfaces 35a against one another.

Turning now to the construction of the automatic shut-off valve assemblies 18, each of these assemblies includes an annular valve element 51, which is movable axially along the previously mentioned main axis 30 of the apparatus, between the open position of FIG. 2 and a closed position in which deformable seal washer 52 carried by element 51 annularly engages an annular seat surface 53 on part 25. To mount the valve for this axial movement, part 51 is rigidly attached to a tubular stem member 54, whose inner end may be grooved at 55 and cast into part 51, to secure these parts rigidly together. Tubular stem 54 is mounted within a tubular sleeve 56 for only axial movement relative thereto, with sleeve 56 being rigidly secured at 57 to a bonnet or spider structure 58, whose mounting ring portion 59 is rigidly attached by a plurality of circularly spaced bolts 60 to ring 25. About each of the bolts 60 there is provided a spacer sleeve 61, axially between ring 25 and ring 59, to maintain the latter in the illustrated spaced relation with respect to ring 25.

Valve 51 is continuously yieldingly urged toward its closed position (to the right in FIG. 2) by a rather heavy and strong coil spring 62, which is interposed axially between and engages opposed shoulders on parts 51 and 56 respectively. Such closing actuation of valve 51 is normally prevented, however, by a latching or holding mechanism including several ball detents 63 coacting with parts 54 and 56, and with a spring pressed plunger part 64 contained within element 54. There may typically be four of the balls 63, mounted within a series of circularly spaced apertures 65 formed in part 54, and free of limited radial movement within those apertures. In the FIG. 2 holding position of balls 63, the radially outer portion of each ball is received within an annular groove 66 formed in the inner surface of part 56, with this engagement serving to effectively latch part 54 and the carried valve elements 51 and 52 against rightward movement under the influence of spring 62. To hold each of the balls in this outwardly projected latching position, plunger 64 has an annular surface 67 which engages the balls in the FIG. 2 position, and prevents them from moving radially inwardly out of the latch groove 66. The balls can be released for radially inward movement, toward axis 30, by shifting plunger 64 to the right sufficiently to allow the balls to fall into annular groove 68 formed in the plunger adjacent surface 67. The plunger is yieldingly urged to the left in FIG. 2, and to its illustrated latching position, by means of a coil spring 69, bearing against a ring 70, with this leftward movement being limited by engagement of a shoulder 72 with balls 63.

The plunger 64 is actuated to the right, to its latch releasing position, by means of the previously mentioned flexible cable 19 which may be a conventional steel cable, formed of several twisted strands of wire. The cable is attached at 119 to an extension 120 of plunger 64, which extension passes through apertures 73 in parts 51 and 70, and through the interior of coil spring 69.

When valve 51 is in its closed position, the ball detent elements 63 may be moved entirely out of tubular element 56. In order to then retain these balls against loss from apertures 65, the material of part 54 is purposely staked or upset at 78, in a manner restricting the dimension of the outer portion of each aperture 65 to a size smaller than the ball diameter, so that the ball cannot move completely out of the aperture. For actuating valve 51 leftwardly to its opened position, I may utilize a setting element, such as a nut 43 threadedly engageable with valve stem 54 and bearing against part 56 to draw the valve to the left in response to rotation of the nut. During the initial portion of this movement, a pull may be exerted on cable 19 to free the balls for entry into part 56. After the valve is set in opened position, nut 43 is completely removed from the valve stem and the valve is then ready for operation.

To now describe the overall manner of operation of the apparatus shown in the drawings, assume that the apparatus is all assembled in the manner shown in FIGS. 1 to 5, with connecting assemblies 17 in their unbroken conditions, and with valve assemblies 18 in their illustrated open condition. The interconnector 14 then allows free flow of fuel between the two cells 11, without obstruction by the valves. If the aircraft crashes, and does so in a manner creating a predetermined substantial force tending to tear one of the cells away from the other, this force will break or tear one or both of the parts 37 in a manner such that the cells may be freely separated. The tabs 13 are of course of such light construction that they too will readily tear under the influence of the crash forces.

When the crash forces tending to separate rings 20 and 21 are exerted transversely of the axis 30 of these parts, the intermediate connector ring 37 will normally tear cleanly along an annular line extending along the juncture of parts 20 and 21. If on the other hand the separating forces are in an axial direction, the ring 37 may pull axially out of one of the annular recesses (in part 20 or 21) within which it is embedded. In this event, part 37 will normally tear at the locations of apertures 38 (as for instance along the broken lines represented at 138 in FIG. 3) to break the mechanical connections formed by extension of the material of the casting through these apertures. If the parts are as shown in FIG. 6, an axial force may pull one end of ring 37a out of its recess in part 20a or 21a, with one of the flares 38a of part 37a being deformed to an axially extending condition to allow such relative separating movement of the parts.

After the ring 21 or 21a and associated cell have thus been detached from ring 20 or 20a, the crash induced forces will shift the freed cell away from the other cell in a manner such that cable 19 extending between the two cells will automatically pull the two plungers 64 of valve assemblies 18 in the two cells inwardly toward one another. This inward movement of pungers 64 moves the grooves 68 of these plungers to locations opposite balls 63, to thus release the balls from within groove 66, and allow the two valves 51 to move to their closed positions under the influence of springs 62. The cable 19 may be short enough to effect this actuation of the valves in response to very small movement of the cells relatively apart, so that the two valves 51 are closed almost simultaneously with the disconnection of either of the connecting assemblies 17. Thus, the crash forces first break the connection at one of the assemblies 17, and then almost simultaneously with this release function to close both of the valves 51, to prevent the escape of fuel from the interior of either of the cells. Further, cable 19 is formed of a material which is capable of breaking when the tensile forces exerted thereon reach a predetermined value, say a pull of 500 pounds, so that the cable will itself break, after actuating the valves, to prevent the cable from interfering with free movement of one cell relative to the other. The cable is so designed that it will break under the influence of crash forces which are smaller than any forces which would be required to rupture either of the cells 11.

FIG. 7 shows a somewhat variational form of connection constructed in accordance with the invention, and which may be considered to be identical with that of FIGS. 1 to 5 except that the part 14b is a vent line, or some other type of line connected to only one cell 11b, rather than being an interconnector such as that shown at 14 in FIG. 1 and extending between two cells. In this case, there is provided a connecting assembly 17b corresponding to assembly 17 of FIG. 1, and attaching the cell to tube 14b and structural part 15b. Also, there is provided in FIG. 7, a valve assembly 18b which may be identical with one of the valve assemblies 18 in FIGS. 1 to 5, but whose actuating cable 19b is attached at its opposite end to some stationary part, such as a rigid spider or a web 84 attached to part 14b. As will be understood, valve assembly 18b is normally in its open condition, allowing free communication between the interior of cell 11b and the vent line or other line 14b. However, in the event of a crash of the aircraft, connecting assembly 17b will first break, following which the pull exerted by cable 19b on the plunger of valve assembly 18b will automatically close the valve assembly to prevent leakage of any fuel from the tank past the valve.

Referring again to FIG. 1 of the drawing, it may be mentioned that in some cases the structural walls 15 may not be present between adjacent cells. Also, the interconnector 14 may in some installations be much shorter than in the drawing, or if desired may be omitted completely, with the two rings 20 of FIG. 1 being formed integrally as a single part which would itself then function as the interconnector, with the two rings 21 and associated cells attached to the opposite sides of this part.

I claim:

1. In an aircraft, the combination comprising a crash resistant fluid containing cell mounted in the craft and adapted to resist rupture even if torn from its normal position relative to an adjacent portion of the craft by a crash, and a fluid conducting assembly detachably connecting said cell to said adjacent portion of the aircraft, said assembly including a first tubular member connected to said cell in communication with the interior thereof through an opening in a wall of the cell, a second tubular member connected to said adjacent portion of the aircraft and forming essentially a continuation of said first member, and a third tubular member detachably interconnecting said first two members and extending therebetween and having its opposite ends embedded in the material of said first two members respectively at locations between the radially inner and outer surfaces of said first two members so that the material of each of said first two members extends along both the radially outer side and the radially inner side of said third member, said three members forming together a fluid tight joint for conducting fluid between said first two members, said third member being weaker than said first two members and preformed to fail and thereby break the connection between the first two members when the cell is displaced by a crash relative to said adjacent portion of the craft.

2. The combination as recited in claim 1, in which said first two members are die cast metal parts.

3. The combination as recited in claim 1, in which said third member is a thin walled worked metal part.

4. The combination as recited in claim 1, in which said third member is a thin walled stainless steel part.

5. The combination as recited in claim 1, in which said first two members are die cast metal parts, and said third member is a stainless steel ring thinner than the first two members.

6. The combination as recited in claim 1, in which said first two members have axially opposed tapering surfaces substantially in engagement at the location at which said third member projects into the material of the first two members.

7. The combination as recited in claim 1, in which there are two of said cells placed in communication by a tubular interconnector and two of said fluid conducting assemblies at opposite ends of the interconnector connected to the two cells respectively, each of said assemblies including said three members in the relation defined in claim 1 with the third member being embedded in the first two members.

8. The combination as recited in claim 1, in which said opposite ends of the third member contain perforations through which the material of said first two members extends to assure a good connection with said first two members.

9. For use in an aircraft having a crash resistant fluid containing cell mounted therein adapted to retain its integrity as a unitary cell even if torn from its normal position relative to an adjacent portion of the craft by a crash; the combination comprising a fluid conducting assembly for detachably connecting said cell to said adjacent portion of the aircraft, said assembly including a first tubular member to be connected to said cell in communication with the interior thereof through an opening in a wall of the cell, a second tubular member to be connected to said adjacent portion of the aircraft and forming essentially a continuation of said first member, and a third tubular member interconnecting said first two members and extending therebetween and having its opposite ends embedded in the material of said first and second members respectively, at locations between the radially inner and outer surfaces of said first two members so that the material of each of said first two members extends along both the radially outer side and the radially inner side of said third member, said three members forming a fluid tight joint for conducting fluid between said first two members, said third member being weaker than that said first two members and preformed to fail and thereby break the connection between the first two members when the cell is displaced by a crash relative to said adjacent portion of the craft.

10. The combination as recited in claim 9, in which said first two members are die cast metal parts.

11. The combination as recited in claim 9, in which said first two members are die cast metal parts, and said third member is a stainless steel ring thinner than said first two members.

12. The combination as recited in claim 9, in which said first two members have axially opposed tapering surfaces substantially in engagement at the location at which said third member projects into the material of the first two members.

13. The combination as recited in claim 9, in which said opposite ends of the third member contain perforations through which the material of said first two members extends to assure a good connection with said first two members.

14. In an aircraft, the combination comprising a crash resistant fluid containing cell mounted in the craft and adapted to resist rupture even if torn from its normal position relative to an adjacent portion of the craft by a crash, and a fluid conducting assembly detachably connecting said cell to said adjacent portion of the aircraft, said assembly including a first tubular member connected to said cell in communication with the interior thereof through an opening in a wall of the cell, a second tubular member connected to said adjacent portion of the aircraft and forming essentially a continuation of said first member, and a third tubular member detachably interconnecting said first two members and extending therebetween and having its opposite ends embedded in the material of said first two members respectively at locations between the radially inner and outer surfaces of said first two members so that the material of each of said first two members extends along both the radially outer side and the radially inner side of said third member, said three members forming a fluid tight joint preformed to be broken at the location of said third member when the cell is displaced by a crash relative to said adjacent portion of the craft.

15. The combination as recited in claim 14, in which said first two members are die cast metal parts having opposed end surfaces extending into close proximity with one another, said third member being a worked metal part thinner than said first two members.

16. The combination as recited in claim 14, including a valve associated with said first member for closing off communication with the interior of said cell through said fluid conducting assembly, and means for automatically closing said valve when said cell is displaced and said joint is thereby broken.

17. For use in an aircraft having a crash resistant fluid containing cell mounted therein adapted to retain its integrity as a unitary cell even if torn from its normal position relative to an adjacent portion of the craft by a crash; the combination comprising a fluid conducting assembly for detachably connecting said cell to said adjacent portion of the aircraft, said assembly including a first tubular member to be connected to said cell in communication with the interior thereof through an opening in a wall of the cell, a second tubular member to be connected to said adjacent portion of the aircraft and forming essentially a continuation of said first member, and a third tubular member interconnecting said first two members and extending therebetween and having its opposite ends embedded in the material of said first and second members respectively at locations between the radially inner and outer surfaces of said first two members so that the material of each of said first two members extends along both the radially outer side and the radially inner side of said third member, said three members forming a fluid tight joint preformed to be broken at the location of said third member when the cell is displaced by a crash relative to said adjacent portion of the craft.

18. The combination as recited in claim 17, including a valve associated with said first member for closing off communication with the interior of said cell through said fluid conducting assembly, and means for automatically closing said valve when said cell is displaced and said joint is thereby broken.

References Cited in the file of this patent

UNITED STATES PATENTS

| 1,977,432 | Dick | Oct. 16, 1934 |
| 2,008,002 | Calkins | July 16, 1935 |
| 2,048,388 | Johnsen | July 21, 1936 |
| 2,102,590 | Gray et al. | Dec. 21, 1937 |
| 2,812,571 | Strom | Nov. 12, 1957 |
| 2,882,072 | Noland | Apr. 14, 1959 |

FOREIGN PATENTS

| 209,821 | Great Britain | Jan. 17, 1924 |
| 978,686 | France | Nov. 29, 1950 |